Patented Oct. 7, 1941

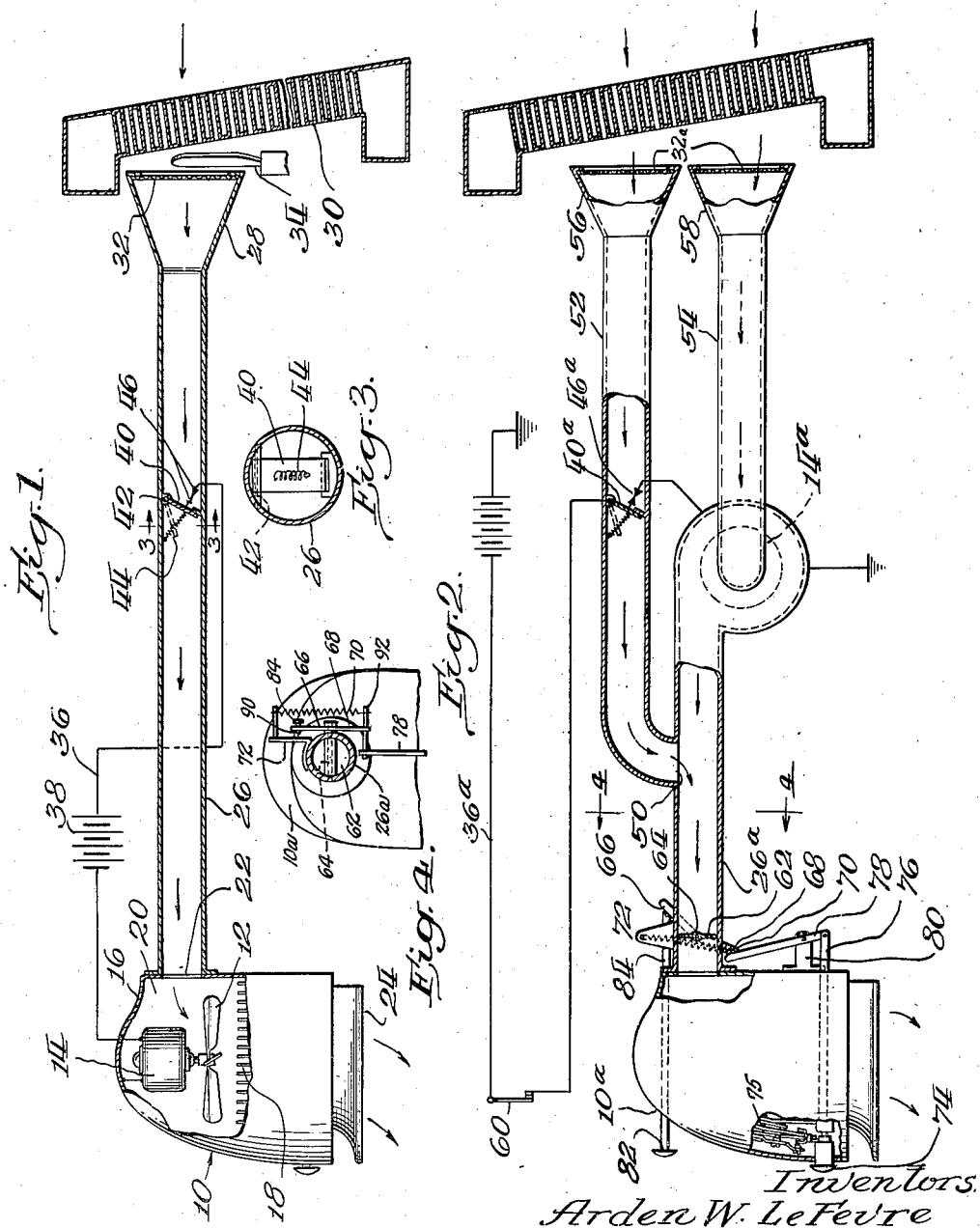

2,257,967

UNITED STATES PATENT OFFICE 2,257,967

AUTOMOBILE HEATER

Arden W. Le Fevre and Thomas F. Spackman, Chicago, Ill., assignors to Stewart-Warner Corporation, Chicago, Ill., a corporation of Virginia Application October 31, 1938, Serial No. 237,840

5 Claims. (Cl. 98—2)

The present invention relates generally to automobile heaters and the like and more particularly to systems for supplying heaters of the class described with air to be used for heating passenger compartments of automobiles.

One of the objects of the present invention is to provide an improved air supply system for automobile heaters or the like.

Another object of the invention is to provide an air supply system for automobile heaters wherein air resistance and other factors developed independently of heater operation may be employed to relieve the power device employed in circulating the air through the heater.

Another object of the invention is to provide a control for a heater motor wherein the control is responsive to factors capable of supplanting the work of the motor.

Another object of the invention is to provide an improved heating system for automobiles wherein air resistance and factors created by automobile operation employed to circulate air through a heat exchange device in the interior of the passenger compartment may be supplemented under predetermined conditions by an independently powered air circulating device.

Another object of the invention is to provide an air supply system for an automobile heater or the like wherein air is received from two independent points and a blower is brought into operation to augment the supply whenever factors created by automobile operation are insufficient to maintain a predetermined rate of flow of air through the heater for the proper heating of the automobile.

Another object of the invention is to provide a device of the class described which is simple in construction and operation, thoroughly effective in its use, and inexpensive to manufacture and operate.

These being among the objects of the invention, other and further objects will become apparent from the drawing herein, the description relating thereto, and the appended claims.

Referring to the drawing,

Fig. 1 is a side elevation partly in section illustrating diagrammatically a preferred embodiment of the invention;

Fig. 2 is a view similar to Fig. 1 illustrating another form of the invention;

Fig. 3 is a section taken upon the line 3—3 in Fig. 1; and

Fig. 4 is a sectional view taken along the line 4—4 of Fig. 2, showing a valve for controlling the flow of air through the heater and the means for controlling this valve.

In Fig. 1 a heater 10 located upon the inside of a passenger compartment of a motor vehicle is shown with a fan 12 and a motor 14 located in the shell 16 thereof which houses the radiator 18 or heat exchange unit employed to heat the interior of the compartment. Air is supplied to the fan compartment 20 through the opening 22 in the shell 16 and is driven by the motor 14 and fan 12 through the radiator 18 in heat exchange relationship and out into the interior of the passenger compartment through the bell-like opening 24.

A conduit 26 supplies air to the heater 10 and is provided with an outwardly flaring mouth 28 located either behind or to one side of the radiator 30 of the automobile engine cooling system. A dirt screen 32 is located in the mouth 28, and in installations where the mouth is located behind the radiator 30 it is preferable to locate it in the air-stream of the engine fan 34 so that the blades thereof will operate to build up a certain degree of pressure at the mouth 28 in addition to the pressure created by the air resistance developed in front of the car when the car is moving.

The area of the mouth 28, as located either in or outside of the air-stream of the engine fan 34, is such as to induce, under most automobile operating conditions, a flow of air through the conduit 26 in an amount appreciably greater than the amount commonly drawn therethrough by the fan 12 and motor 14. An air flow responsive vane 40 is pivotally mounted as at 42 in the conduit 26 and is supported by a spring 44 against the flow of air through the conduit 26. The effective area of the vane 40 is such that it does not reduce materially or interfere with the amount of air the fan 12 is capable of handling, and the spring 44 is adjusted to yield when the amount of air flowing through the conduit 26 exceeds that normally drawn by the fan and motor through the conduit 26.

The motor 14 is powered by the battery 38 through an electrical circuit 36, and the vane 40 operates the contacts 46 of a switch located in the circuit 36 whereby the circuit supporting the motor is broken whenever the vane is moved in a direction against the spring 44 by the air flowing through the conduit. Thus, the motor and fan are shut off when the factors created by the operation of the automobile are sufficient to maintain proper circulation of air in the passenger compartment, and in this way an economical air supply system is thereby provided and a saving in electricity is accomplished without impairing the circulation inside the compartment in any degree.

In the embodiment illustrated in Fig. 2 the conduit 26a is bifurcated at 50 and each portion 52 and 54 leads to separate, flared mouths 56 and 58 also covered by dirt screens 32a. In this embodiment the motor 14a and vane 40a work in parallel as located respectively in the two bifurcated portions 54 and 52, one in one portion and the other in the other portion. The motor 14a drives a blower (not shown), and the switch controlled vane 40a is set to break the contacts 46a when the air pressure built up at the mouths 56 and 58 is sufficient to carry on the circulation of air through the heater 10a. However, in this instance there will be some flow through the blades of the blower even when the motor 14a is shut down, since air pressure will be present at both mouths 56 and 58, and consequently the size and shape of the vane or the tension exerted by the spring may be arranged so that the contacts of the switch 46a will be broken at a much lower air flow point than would be the case with Fig. 1. This effects additional savings in heater operation, since it is possible to have the motor off at longer intervals than may be desirable with the embodiment shown in Fig. 1, and in this instance a manually controlled switch 60 may be employed to break the circuit 36a, so that the motor may be shut off regardless of whether or not the switch is broken by the vanes if the occupants of the vehicle receive a sufficient amount of air for their comfort, even though it may be less than that which would be induced by the motor or controlled by the vane.

In this way an air supply system for circulation over a heater to a passenger compartment for use of the passengers is provided and fresh air is continuously supplied to the interior compartment at substantial savings in electricity with an optimum of controls for passenger comfort.

Under some circumstances, when the heater is not in operation, it may be desirable to shut off the supply of fresh air to the passenger compartment of the vehicle. Means for accomplishing this result is shown incorporated in the embodiment of Fig. 2 and is shown in cross section in Fig. 4, although it may, with equal advantage, be incorporated in the construction shown in Fig. 1. This means comprises a butterfly valve 62 pivotally mounted in the conduit 26a, upon an operating stem.

Since it would be undesirable to have the valve 62 closed while the heater is in operation, the means for operating this valve is so arranged that it is necessarily opened when the heater switch is actuated to set the heater in operation.

Means for operating the valve 62 comprises a two-armed lever comprising arms 66 and 68. The arm 68 has a tension coil spring 70 attached thereto, the other end of the coil spring being attached to a bracket 72 beyond the axis of the stem 64, so that the spring will act to maintain the valve 62 either in fully open position, or in fully closed position, suitable stops being provided to limit the motion of the valve 62. The operation of the heater is controlled by a knob 74 to which a draw link 76 is attached. Positioned within the heater is a switch 75 which controls the operation of the heater and the fan. This switch is opened and closed by the movement of the knob 74, the switch being open when the knob is in its "in" position or a position such that the knob is immediately adjacent the shell of the heater. To put the heater in operation, the knob 74 is pulled outwardly (to the left in Fig. 2), thereby closing the switch 75 which puts the heater and fan in operation. This same movement of the knob 74 moves a draw link 76 to the left and swings a lever 78 clockwise about its pivot on a fixed bracket 80 and through engagement of the lever 78 with a pin 92 on the arm 68 (shown clearly in Fig. 4), causes the lever comprising the arms 66 and 68 to rotate counter-clockwise, thereby moving the valve 62 to its open position. It will thus be seen that whenever the heater is in operation, the valve 62 will be open. When the knob 74 is pushed inwardly to put the heater out of operation, the lever 78 will be rotated counterclockwise, moving away from the pin 92 and leaving the valve 62 in its open position. When the heater is not in operation and the valve 62 is open, it may be moved to closed position by pushing inwardly upon a control knob 82, thereby causing a sidewardly projecting pin 90 in the end of rod 84 to engage the arm 66 and swing the valve 62 clockwise to closed position. From this arrangement it will be observed that if the control knob 82 is pushed inwardly to close the valve 62 when the heater is in operation, this movement will result in the clockwise rotation of the lever comprising arms 66 and 68, thereby engaging the lever 78, rotating it counter-clockwise and, through link 76, causing the switch 75 to be open, and putting the heater out of operation.

It is thus seen that the valve 62 may be opened only by pulling knob 74 outward, and closed only by pushing knob 82 inward.

By this means, overheating of the heater is obviated, and the passenger of the vehicle has under his control the supply of fresh air to the passenger compartment whenever the heater is not in operation. A valve similar to valve 62, together with its operating means, may be utilized in the form of the invention shown in Fig. 1 as well as in the form shown in Fig. 2.

Although several embodiments of the invention have been shown and described herein, it will be apparent to those skilled in the art that various and further uses, modifications and changes may be made without departing from the spirit and substance of the invention, the scope of which is commensurate with the appended claims.

What is claimed is:

1. In a heating device for motor vehicles a heater, a switch for operating said heater, a conduit supplying said heater with air, a blower for moving air through said conduit, a motor for operating said blower, a source of energy for said motor, air responsive means in said conduit for making and breaking contact between said motor and said source of energy, a valve for closing said conduit, means for opening said valve simultaneously with the actuation of the heater switch, and independent means for closing said valve when said heater is not in operation.

2. In a heating device for motor vehicles, a heater, a switch for operating said heater, a conduit supplying said heater with air and bifurcated at the end thereof remote from said heater, a blower in one of said bifurcations for delivering air to said heater, a motor connected to said blower, a source of energy for said motor, airflow responsive means in the other of said bifurcations for making and breaking contact between said source of energy and said motor, a valve at a point near said heater for closing said conduit, means for opening said valve simultaneously with the actuation of the heater switch, and independent means for closing said valve when said heater is not in operation.

3. In a heating system for automobiles, having a heater, a conduit supplying said heater with air, a blower for moving air through said conduit, and a motor operating said blower; the combination of a valve in said conduit, a lever attached thereto for opening and closing said valve, means engageable with one end of said lever for opening said valve incidental to conditioning said heater for operation, and independently operated means engageable with said lever to close said valve.

4. In a heating system for automobiles, having a heater, a conduit supplying said heater with air, a blower for moving air through said conduit and heater, an electric motor operating said blower, and an electric circuit for supplying said motor with energy; the combination of a valve in said conduit, a lever for opening and closing said valve, a push-pull switch to open and close said circuit, means connected with said switch to engage said lever and open said valve incidental to closing said circuit, and independently operated means to engage said lever and close said valve.

5. In a heating system for automobiles, comprising a heater, a conduit supplying said heater with air, a blower for moving air through said conduit and heater, an electric motor for operating said blower, and an electric circuit for energizing said motor; the combination of a valve in said conduit, a lever for opening and closing said valve, a switch to open and close said circuit, means connected with said switch to push against said lever so as to open said valve incidental to closing said circuit, independently operated means to push against said lever to close said valve, and means for retaining said valve in open or closed position.

ARDEN W. LE FEVRE.
THOMAS F. SPACKMAN.